United States Patent Office.

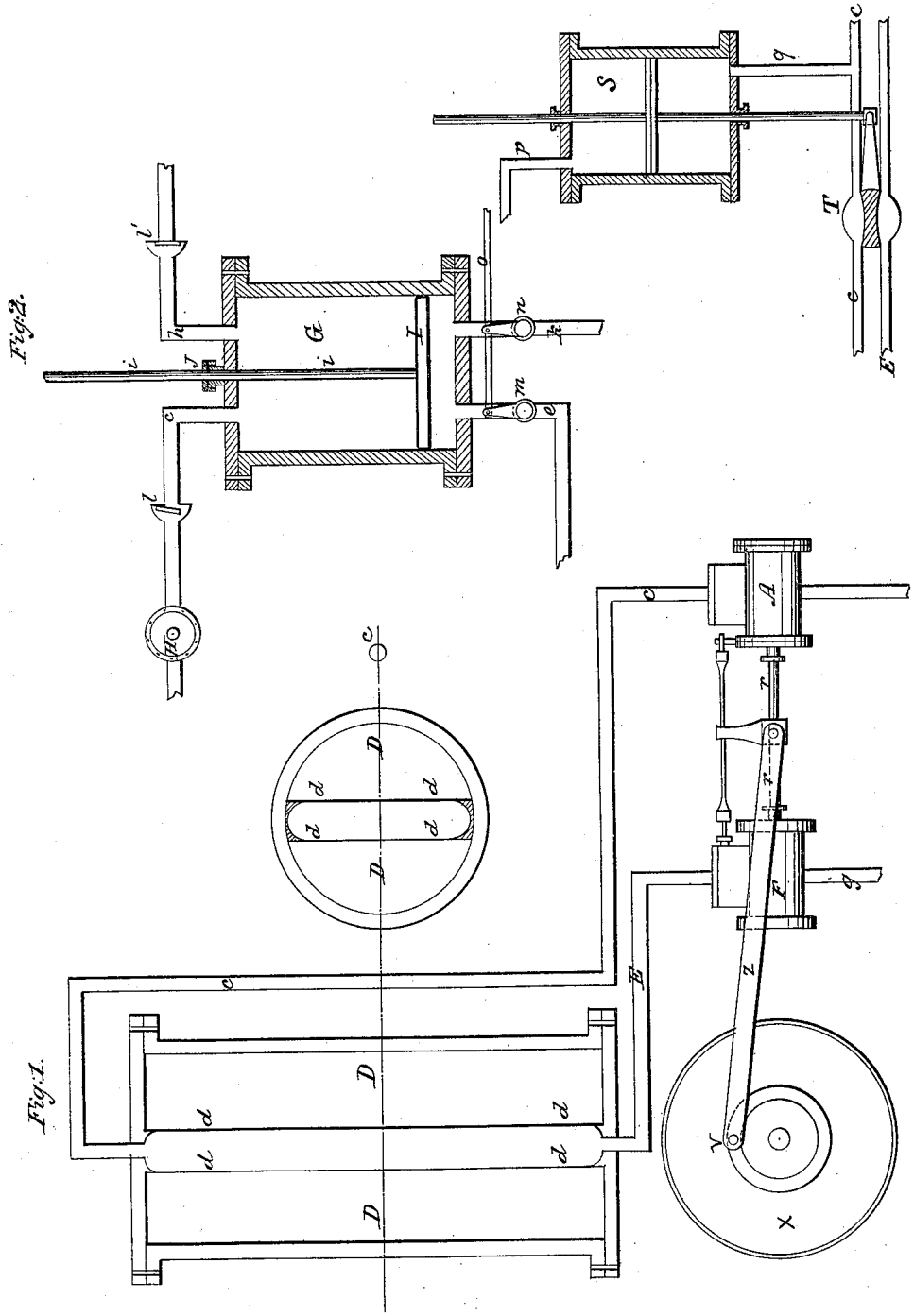

JAMES S. BALDWIN, OF NEWARK, NEW JERSEY.

Letters Patent No. 89,617, dated May 4, 1869.

METHOD OF CONTROLLING AND REGULATING THE FLOW OF LIQUIDS UNDER PRESSURE

The Schedule referred to in these Letters Patent and making part of the same.

*To all whom it may concern:*

Be it known that I, JAMES S. BALDWIN, of Newark, in the county of Essex, and State of New Jersey, have invented a new and useful Method of Controlling and Maintaining the Temperature of Substances under Pressure; and I do hereby declare the following to be a full and sufficient description thereof, reference being had to the accompanying drawings, and to the letters of reference marked thereon, making a part of this specification.

It is necessary, in condensing gases and vapors to the liquid form under a heavy pressure, in heating or evaporating them, and in conducting various chemical and mechanical operations, that the containing-vessel shall have walls of great strength and consequent thickness, a condition which imposes a formidable obstacle to raising, lowering, or maintaining the temperature of the enclosed substance.

To overcome this difficulty, I force into the containing-vessel a sufficient quantity of any suitable liquid, previously brought to any desired temperature.

This liquid performs its office by circulating, either in direct contact with the enclosed substance, or through channels of any desired shape, having very thin walls of high heat-conducting power, the substance operated upon being in contact with said partitions.

The separating-wall has for its object the prevention of contact and mixture between the circulating liquid and the substance operated upon, and is not required to sustain more than a slight degree of pressure. It is dispensed with whenever it can be.

The circulating liquid having performed its duty by imparting or abstracting heat, flows off through a suitable channel, and being still at a tension as great as that at which it entered the containing-vessel, is made to furnish all, or nearly all, the power required to force in an equivalent volume of fresh liquid, and it is in the economy of power thus attained that my improvement chiefly consists.

The means employed for this purpose are simple and easily controlled.

It is well known that if the steam-cylinder of an ordinary steam-pump is supplied with a liquid under sufficient pressure, it will be operated as effectually as if steam were used, though much more slowly.

Such an apparatus is represented in the drawing, and as the functions of its several parts are well understood by all machinists, I need not particularly describe them.

A, in Figure I, is the cylinder of the forcing-pump, which draws the liquid from any suitable reservoir, where it has previously been brought to the required temperature, and forces it, through the pipe C C, into the containing-vessel D D.

$d\ d\ d\ d$ are the partition, or separating-wall, hereinbefore described.

The liquid then flows through the pipe E, being still at its maximum tension, to the motor-cylinder F, where it yields up its power, and then quietly passes off through $g$.

The power developed in F is transmitted, by the piston-rod $r\ r$, to A; for the purpose already set forth.

In some cases, however, a different method may be employed.

G is a cylindrical vessel, of sufficient strength to resist the maximum pressure used.

$c$ and $e$ are pipes, which are only partially represented, but which would in actual practice, respectively, replace and perform the functions of C C and E.

$h$ is a pipe connecting G with a reservoir of liquid of the desired temperature.

$k$ is the waste-pipe, corresponding to $g$ in the plan already described.

$l\ l'$ are check-valves permitting a current only in the direction indicated by the arrows.

$m$ and $n$ are stop-cocks of the ordinary description, simultaneously operated by the rod $o$, and so adjusted that the movement of said rod, which closes $m$, will, after it is entirely closed, open $n$, and *vice versa*.

H is a pump, which, owing to the lightness of its duty, is preferably of the turbinate or rotary character, although any other pump would answer.

This pump is operated by a belt and pulley, not shown in the drawing, as there is nothing novel in their character or application.

I is a piston, moving freely.

$i\ i$ are the piston-rod, running through the stuffing-box J.

The object of this piston is to prevent the mixture of the fresh liquid with that which has performed its duty, and had its temperature changed thereby.

This piston could be replaced by a flexible septum, or diaphragm, and, in some cases, could be entirely dispensed with.

If, now, the space above I is occupied by fresh liquid received through $h$, $m$ having been open and $n$ closed during its entry, the waste liquid passing off through $k$, we have only to move the rod $o$, closing $m$ and opening $n$, to establish an equilibrium of pressure between G and D.

The pump H is now set in motion, and the liquid above I drawn from G and forced through D, while the waste liquid from the latter occupies the space below I, which rises during the operation.

The valves $l\ l'$ prevent any reflex movement through the pipes $c$ and $e$, while the several operations are in progress, and it is obvious, that by the repetition of said operations, any desired quantity of liquid can be passed through the containing-vessel D.

In some cases, the pump H can be dispensed with, and its functions performed by the piston I, which would then receive a regular reciprocating motion from appropriate machinery, the cocks $m$ and $n$ being opened and closed at the proper moments, as in the preceding case.

It is obvious that any substance capable of passing through tubes, whether it be gaseous, liquid, or semi-fluid, may be introduced into the space outside of $d\ d\ d\ d$, and removed therefrom by means similar to those hereinbefore described, and I usually employ this plan.

In the preceding description, it has been assumed that the volumes, respectively, of the inflowing and outflowing currents, are practically the same, but when the liquid gains or loses any considerable amount of heat, in passing through D, its volume will be correspondingly increased or diminished, and the relative capacities of F and A must be proportioned accordingly.

Any deficiency of power that may exist from this cause, together with that required to overcome the friction of moving parts, is supplied from any convenient source of power, through the wheel X, crank Y, and connecting-rod Z.

When G is employed, any deficiency may be supplied by an ordinary force-pump, and any surplus may be drawn off through a suitable pipe, and its power applied to any useful purpose.

When the capacity of F is much greater than that of A, by reason of the increased volume of the outflowing current, there will be developed a surplus of power, which can be taken from X by a belt, and applied to practical uses.

Figure II represents an apparatus, which I employ when necessary to secure an equal pressure on both sides of $d\ d\ d\ d$, thus securing it from any danger of rupture. It is shown detached and on a larger scale, for ease of illustration.

S is a cylinder, fitted with a piston and rod.

T is a four-way cock, the movement of which will simultaneously open or close the passage through C C and E, which, in this case, are connected with said cock, as shown.

The space above the piston P communicates with that portion of D outside of $d\ d\ d\ d$, by the pipe P, and the space below it is connected with C C by the short pipe $q$.

S being thus connected with the space on either side of the partition $d\ d\ d\ d$, any inequality of pressure will immediately be followed by a movement of the piston-rod and the cock T, which is connected with it as shown, and this movement effectually closing the passage through C C and E, prevents the forcing in of $d\ d\ d\ d$, owing to the practical incompressibility of the enclosed liquid, or it prevents said partition from being forced out, by preventing the ingress of more liquid through C C.

The circulating-liquid, which I prefer to use, is an oil not liable to gum, but many other liquids will answer the purpose.

What I claim as my invention, and desire to secure by Letters Patent, is—

1. Utilizing the power of outflowing currents, as described.

2. The equalizing-device represented in Fig. II.

JAMES S. BALDWIN.

Witnesses:
S. BALDWIN,
S. A. BALDWIN.